United States Patent
Bustamante et al.

(10) Patent No.: US 12,382,133 B2
(45) Date of Patent: Aug. 5, 2025

(54) EYE GAZE AS A PROXY OF ATTENTION FOR VIDEO STREAMING SERVICES

(71) Applicant: Phenix Real Time Solutions, Inc., Chicago, IL (US)

(72) Inventors: Fabián E. Bustamante, Evanston, IL (US); Stefan Birrer, Chicago, IL (US); Roy Reichbach, Chicago, IL (US)

(73) Assignee: PHENIX REAL TIME SOLUTIONS, INC., Chicago, IL (US)

( * ) Notice: Subject to any disclaimer, the term of this patent is extended or adjusted under 35 U.S.C. 154(b) by 207 days.

(21) Appl. No.: 18/058,016

(22) Filed: Nov. 22, 2022

(65) Prior Publication Data

US 2023/0164387 A1 May 25, 2023

Related U.S. Application Data

(60) Provisional application No. 63/282,954, filed on Nov. 24, 2021.

(51) Int. Cl.
| | | |
|---|---|---|
| *H04N 21/442* | (2011.01) | |
| *H04N 21/2187* | (2011.01) | |
| *H04N 21/4223* | (2011.01) | |
| *H04N 21/431* | (2011.01) | |
| *H04N 21/443* | (2011.01) | |

(52) U.S. Cl.
CPC ... *H04N 21/44218* (2013.01); *H04N 21/2187* (2013.01); *H04N 21/4223* (2013.01); *H04N 21/4312* (2013.01); *H04N 21/4438* (2013.01)

(58) Field of Classification Search
None
See application file for complete search history.

(56) References Cited

U.S. PATENT DOCUMENTS

| | | | | |
|---|---|---|---|---|
| 11,747,899 | B2 * | 9/2023 | Chen | G09G 5/14 715/722 |
| 2012/0146891 | A1 * | 6/2012 | Kalinli | H04N 19/33 345/156 |
| 2012/0300061 | A1 * | 11/2012 | Osman | G06F 1/3231 340/436 |
| 2015/0074556 | A1 * | 3/2015 | Bader-Natal | H04L 12/1813 715/753 |

(Continued)

OTHER PUBLICATIONS

Alvarez et al. "How many objects can you track?: Evidence for a resource-limited attentive tracking mechanism" Journal of Vision 2007, 10 pages.

(Continued)

*Primary Examiner* — Alexander Q Huerta
(74) *Attorney, Agent, or Firm* — Perkins Coie LLP; Michael A. Glenn

(57) ABSTRACT

A method uses the eye gaze of a user, as a proxy of their attention, and leverages it to provide a more natural experience in a multi-view, i.e. multi-party and multi-perspective, video streaming service. The method takes advantage of increasingly powerful inexpensive cameras and related software to provide commodity eye-tracking. The method also leverages collected data on user interactions and uses machine learning techniques to customize its response to individual usage patterns. A system is specified for implementing the described method on a streaming architecture.

19 Claims, 8 Drawing Sheets

(56) References Cited

U.S. PATENT DOCUMENTS

| | | | |
|---|---|---|---|
| 2015/0244981 A1* | 8/2015 | Johnson | H04N 21/42203 |
| | | | 348/14.07 |
| 2015/0346832 A1* | 12/2015 | Cole | H04N 13/243 |
| | | | 345/156 |
| 2016/0225012 A1* | 8/2016 | Ha | G06Q 30/0277 |
| 2016/0225122 A1* | 8/2016 | Boelter | G06F 1/3231 |
| 2016/0328130 A1* | 11/2016 | Patel | H04N 21/6581 |
| 2018/0033405 A1* | 2/2018 | Tall | G06T 9/00 |
| 2018/0160160 A1* | 6/2018 | Swaminathan | H04N 21/816 |
| 2018/0248930 A1* | 8/2018 | Boss | H04L 43/0894 |
| 2019/0391641 A1* | 12/2019 | Vanreenen | G06T 5/20 |
| 2020/0273485 A1* | 8/2020 | Jagmag | G06N 3/047 |
| 2021/0216138 A1* | 7/2021 | Weksler | G06F 3/0489 |
| 2021/0400142 A1* | 12/2021 | Jorasch | H04L 65/1069 |
| 2022/0070524 A1* | 3/2022 | Iyer | H04N 21/2393 |
| 2022/0334635 A1* | 10/2022 | Hawkins | H04N 21/234345 |

OTHER PUBLICATIONS

Papoutsaki et al. "Webgazer: Scalable webcam eye tracking using user interactions." International Joint Conference on Artificial Intelligence, pp. 3839-3845, 2016.

Bolt "Gaze-orchestrated dynamic windows" Computer Graphics 15, 3 (Aug. 1981), pp. 109-119. https://dLacm.org/doi/pdf/10.1145/965161.806796.

Zhai et al. "Manual and Gaze Input Cascaded (MAGIC) Pointing" Proc. ACM CHI'99 (1999), pp. 246-253. https://dLacm.org/doi/pdf/10.1145/302979.303053.

* cited by examiner

Key and prediction frames on chunks (top) and streams (bottom).

EYE GAZE AS A PROXY OF ATTENTION FOR VIDEO STREAMING SERVICES

CROSS-REFERENCE TO RELATED APPLICATION(S)

This application claims priority to U.S. provisional application No. 63/282,954, titled EYE GAZE AS A PROXY OF ATTENTION FOR VIDEO STREAMING SERVICES, filed on Nov. 24, 2021, which application is incorporated herein in its entirety by this reference thereto.

TECHNICAL FIELD

Various of the disclosed embodiments concern eye gaze as a proxy of attention for video streaming services.

BACKGROUND

Internet streaming is by far the dominant application for generating traffic on the Internet. In a typical streaming service, video and/or audio data is streamed—as a sequence of packets—from a collection of servers to a plurality of users for playback. Unlike in video-on-demand, Internet streaming content is simultaneously recorded and broadcasted as it happens to one or more users. Internet streaming can be live or real-time.

For purposes of the discussion herein, live media streaming refers to streamed content that is transmitted over the Internet without first being recorded and stored. Live video streaming services have a high tolerance to stream lag, i.e. the time from when the event being streamed, or a specific action within it, takes place to when it is delivered to subscribers. Streaming services take advantage of this lag using large buffers where packets can be collected before playback. For live video streaming, as provided by solutions such as Apple's HLS, stream lags of 10s of seconds are not uncommon and generally considered acceptable.

For purposes of the discussion herein, real-time media streaming refers to the online streaming of media simultaneously recorded and broadcasted as it happens to one or more users, with latencies sufficiently small as to enable natural interaction between participants. The small stream lags of these streaming services let participants react to and/or interact with the content and with other participants in the same stream. An illustration of real-time media streaming envisions a performer responding to requests from an online audience or players in a real-time stream game of cards placing bets while cards are being turned. Note that this definition is not stated in terms of specific latency thresholds, e.g. less than 0.5 seconds, but more generally in terms of supporting natural user interactivity.

Both live and real-time streaming require the use of a codec to compress the media, network, and application protocol localize it, transport it, and use it. Some of the video compression standards commonly used include AVC H.264, H.265, VP8, and VP9.

A media stream is made of a series of key frames, sometimes referred to as intra-frames in VP8 or key frames in MPEG, and prediction frames referred to as inter-frames in VP8 and P-frames in MPEG terminology. Key frames are decoded without reference to any other frame in a sequence That is, the decoder reconstructs such frames beginning from its default state (see FIG. 1). Key frames provide random access or seeking points in a video stream. Prediction frames are encoded with reference to prior frames, specifically all prior frames up to and including the most recent key frame. The correct decoding of a predictive frame depends on the correct decoding of the most recent key frame and all ensuing predictive frames. Consequently, the decoding algorithm is not tolerant of dropped key frames. In an environment in which frames may be dropped or corrupted, correct decoding is not possible until a key frame is correctly received.

State of the art media streaming systems rely on multi-bit rate (MBR) encoding where the source video content is encoded in alternative bitstreams at different coding rates. The content is then streamed in segments or chunks, at varying levels of quality corresponding to different coding rates based on changing network conditions, typically using bit-stream switching between segments.

For real-time streaming, a common approach is to use adaptive bit rate streaming where the encoder encodes a single source video at multiple bit rates. The player client switches between streaming the different encodings depending on available resources. Specifically, the source content is encoded at multiple bit rates and potentially segmented into small multi-second parts. The streaming client is made aware of the available streams at different bit rates, and, if necessary, segments of the streams, by a manifest file. When starting, the client may subscribe to or requests segments from a reasonably low bit rate stream. If the client finds the download speed allows for a greater bit rate, then it may request the next higher bit rate (segments).

If, on the other hand, the client finds the download speed is lower than the bit rate for the stream, then it may subscribe to or request a lower bit rate segment.

Today, events with tens to hundreds of users, many of them with large-screen devices, sharing ultra-high-resolution videos, are not uncommon. These users' increasingly capable devices are leveraged by multi-party applications, e.g. online education, or entertainment, most commonly to approximate a shared room experience by showing many or most of the remaining participants at once to replicate the in-person experience. A new set of services is looking to fundamentally redefine the user experience by leveraging pervasive cameras as alternative and simultaneous perspectives on an event. Imagine attending a concert and, with a minor gesture, being able to select a different seat in the theater or jump on the stage! Or consider watching your favorite sports team score the championship goal from multiple cameras in the stadium, all at once and all synchronized. See FIG. 2, which illustrates the interface of a multi-view streaming application with several windows that correspond to different streams, of different sizes and resolutions and illustrates that different streams could be associated either with different participants in a multi-party application or with different views in a multi-perspective application.

While the number of participants in a multi-party application or perspectives in a multi-perspective application could be as high as 100s, 1000s, or more, there are two fundamental constraints: technology resources and user attention. The demands of applications and users continue to increase with higher definition, more participants, more perspectives, and users' lower tolerance to poor performance. With video streaming technology, on the other hand, there are diminishing improvements in near-optimal adaptive bit rate encoding algorithms and video codecs. Thus, the number of perspectives or participants that can be simultaneously shown with sufficiently high quality is bounded. Beyond technical constraints, even if high-end displays continue to improve in size and resolution, and networks could support the growing demand for high-definition media streaming, there are limits to the number of concurrent elements, e.g. views, that users can track (see George A Alvarez, Steven L. Franconeri; *How many objects can you track?: Evidence for a resource-limited attentive tracking mechanism*. Journal of Vision 2007; 7(13): 14).

A key challenge for multi-party and multi-perspective applications—what is collectively referred to as multi-view streaming applications—is supporting such rich experiences, driven by user preferences, in the context of these constraints.

Current multi-view applications address this challenge by limiting the number of views in a display, regarding either participants or perspectives, through a fixed number (two or three is common) of application use modalities such as one main view and a limited number of secondary views, e.g. Zoom "Speaker" mode, and relying on simple interfaces through which a user explicitly inputs the preferred mode, e.g. clicking on an icon of the preferred modality. This approach fails to capture the natural way in which user's focus shifts during an in-person event, where a user's attention moves seemingly at random from a speaker to other participants or to the audience, or from one side of the stadium to another, or to a bird's eye view.

SUMMARY

Various of the disclosed embodiments concern live and real-time media streaming over packet-switched networks such as the Internet. For purposes of the discussion herein, live media streaming refers to streamed content that is transmitted over the Internet without first being recorded and stored; and real-time media streaming refers to online streaming of media simultaneously recorded and broadcasted as it happens to one or more users, and with latencies sufficiently small as to enable natural interaction between participants.

Motivated by the described need of multi-view applications, embodiments of the invention build on advances in eye-tracking hardware and software. Research on the use of eye gaze as a source of computer input, either alone or in combination with other inputs, has been ongoing for over 40 years. Seminal work by R. Bolt from as early as 1981 suggests that a computer should capture and understand a person's natural modes of expression. His 'Worm of Windows' presents a wall of windows selectable by eye gaze (Bolt, R. A.; *Gaze-orchestrated dynamic windows*. Computer Graphics 15, 3 (August 1981), 109-119. https://dLacm.org/doi/pdf/10.1145/965161.806796). Others have later proposed the use of eye gaze combined with other modes, such as mouse click, that can help disambiguate user input and enrich output (see Zhai, S., Morimoto, C., and Ihde, S.; *Manual and Gaze Input Cascaded (MAGIC) Pointing*. Proc. ACM CHI'99 (1999), pp. 246-253. https://dLacm.org/doi/pdf/10.1145/302979.303053). It is only in recent years that progress on eye-tracking hardware and software suggests the possibility of a commodity eye-tracking interface built on inexpensive web cameras. As an example, A Papoutsaki et al present a real-time online eye tracker system using only the common webcam and shows predictions comparable to those made by the commercial eye tracker Tobii EyeX, with a mean error of 128.9 pixels with an average visual angle of 4.17 or 1.6 inches (see Papoutsaki, A, Sangkloy, P., Laskey, J., Daskalova, N. Huang, J. and Hays, J.; *Webgazer: Scalable webcam eye tracking using user interactions*. In Proc. IJCAI, pp. 3839-3845, 2016).

In view of the foregoing, embodiments of the invention present a method to leverage a user's eye-gaze as a proxy of user attention on video streaming services and use this proxy to provide a more natural experience with multi-view video streaming services. The method leverages new, powerful inexpensive cameras, e.g. webcams, and new software that uses these cameras to provide commodity eye-tracking. Embodiments of the invention also take advantage of collected data on user interactions with machine learning techniques to customize its response to a specific user. A system is also specified for implementing the described method on a streaming architecture.

Embodiments of the invention provide a method, comprising the steps of receiving information on the window focus of attention of the user based on their eye gaze over the last observation period; receiving information on available bandwidth based on passive observations of network conditions; and selecting the fraction of the total screen size and the selected resolution for every view as a function of the focus value of that window, the fraction of the screen, and resolution associated with the main window, and the maximum allocatable bandwidth available.

In further embodiments of the invention, the determination of the focus of attention of the user is based on a machine-learning model of the user trained with past information on user's focus changes.

In still further embodiments of the invention, a more seamless change of focus is achieved by creating backup streams of the needed resolution for views surrounding the current view of focus.

In yet further embodiments of the invention, a more seamless change of focus is achieved by leveraging a machine-learning model of the user to identify the user's commonly selected views and create backup streams for those views at the needed resolution.

DETAILED DESCRIPTION

The following detailed description describes an embodiment of the invention the comprises a method to capture and use the focus of attention of a user to provide a more natural experience with multi-view video streaming services.

Embodiments of the invention leverage a user's eye-gaze as a proxy of user attention, thus taking advantage of new, powerful, inexpensive cameras, and new software that uses these cameras, to provide commodity eye-tracking.

Embodiments of the invention comprise a user device that is wirelessly or wired connected with at least one camera facing the user, and that includes a display, computational resources, and persistent and random-access memory. Embodiments of the device take the form of any of a desktop, a laptop computer, a pad, or a smartphone.

Figure 3:
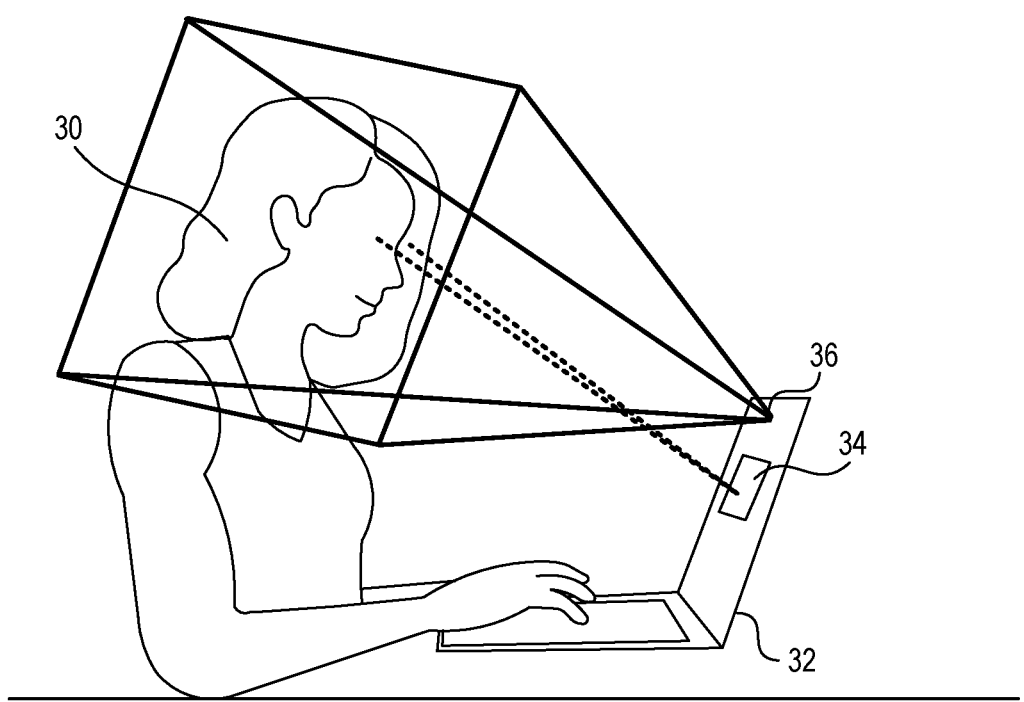
FIG. 3 shows a user and a device equipped with a camera that supports an embodiment of the invention.

FIG. 3 shows a user and a device equipped with a camera that supports an embodiment of the invention in which a user 30 operating a personal device 32 gazes at a focus window 34, and the user's gaze is tracked by an eye-gaze tracking camera 36.

Figure 1:
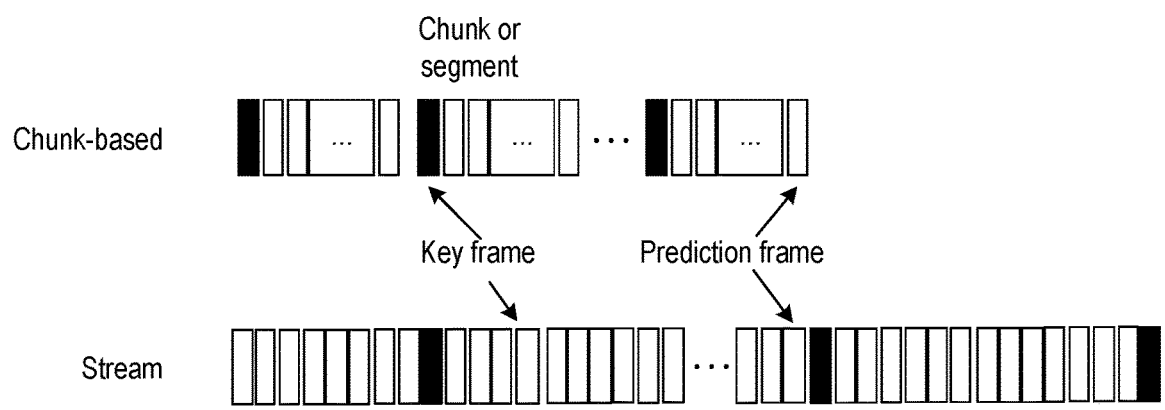
FIG. 1 illustrates key and prediction frames on chunks (top) and streams (bottom)
Figure 2:
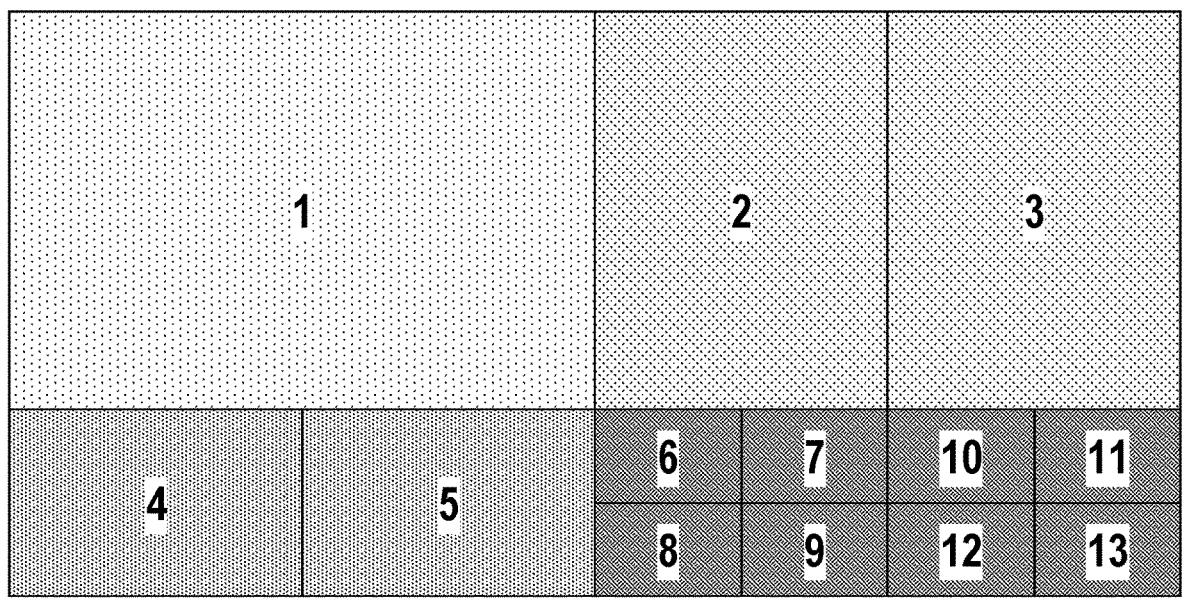
FIG. 2 illustrates the interface of a multi-view streaming application with different streams, of different sizes and resolutions and illustrates that different streams could be associated either with different participants in a multi-party application or with different views in a multi-perspective application.

A multi-view application presents a user with multiple windows, or icons, on a screen representing multiple participants or perspectives. In one instantiation, the multiple windows or icons represent all or a subset of the participants in a multiparty call or multiple view angles of a sporting event. FIG. 2 illustrates the interface of a multi-view streaming application with different streams, of different sizes and resolutions, as shown by windows 1-13, where each window comprises one of a plurality of different streams, of different sizes and resolutions. FIG. 2 illustrates that different streams could be associated either with different participants in a multi-party application or with different views in a multi-perspective application.

Embodiments of the invention rely upon eye gaze to identify the specific window or windows that are the focus of user attention. Every window or icon has an associated focus value, $f\,w$, ranging from 0 to 100, which is proportional to the fraction of time the user's gaze was focused on a particular window or icon over the observation period.

The sum of all windows' focus values is equal to:

$$100(\Sigma_{All\,w} f_w = 100)$$

if the user was solely focused on the speaker, for example, in window 1 in FIG. 2, for the duration of the past observation period, $f1=100$. If the user attention had instead shifted back and forth between two windows, e.g. windows 1 and 2 in FIG. 2, then $f1=f2=50$.

At any given point in time, the fraction of the total screen size of, and the selected resolution for, a particular window or icon is a function of the focus value of that window, the fraction of the screen resolution associated with the main window, and the maximum allocatable bandwidth available. There is a known bandwidth budget for every stream quality level; the available levels of stream quality form a discrete set, e.g. Low, Standard, and High Definition.

The user device's camera and associated software track the user gaze with sufficient precision to select among the available views of a multi-view application. The focus value associated with a window is determined by the input of this device. For instance, if the main window takes 40% of the screen and its maximum resolution requires 30% of the maximum allocatable bandwidth, the total screen allocation for the other windows cannot be larger than 60%; and the bandwidth demand cannot add up to more than 70% of the maximum allocated bandwidth.

Changing Focus of Attention

During the length of a session, a user's attention shifts between windows perhaps focusing on different participants or the total audience. Embodiments of the invention dynamically adjust the budget allocated to a particular window and its associated stream quality level as a function of user attention. It does this by dividing the session into observation periods, potentially of seconds of duration, and tracking a user focus on the different views of a multi-view application interface during each period. The focus value of a window determined during observation period t is used to allocate its fraction of screen size and assign the most appropriate resolution for its associated stream during observation period t+1.

Figure 4:
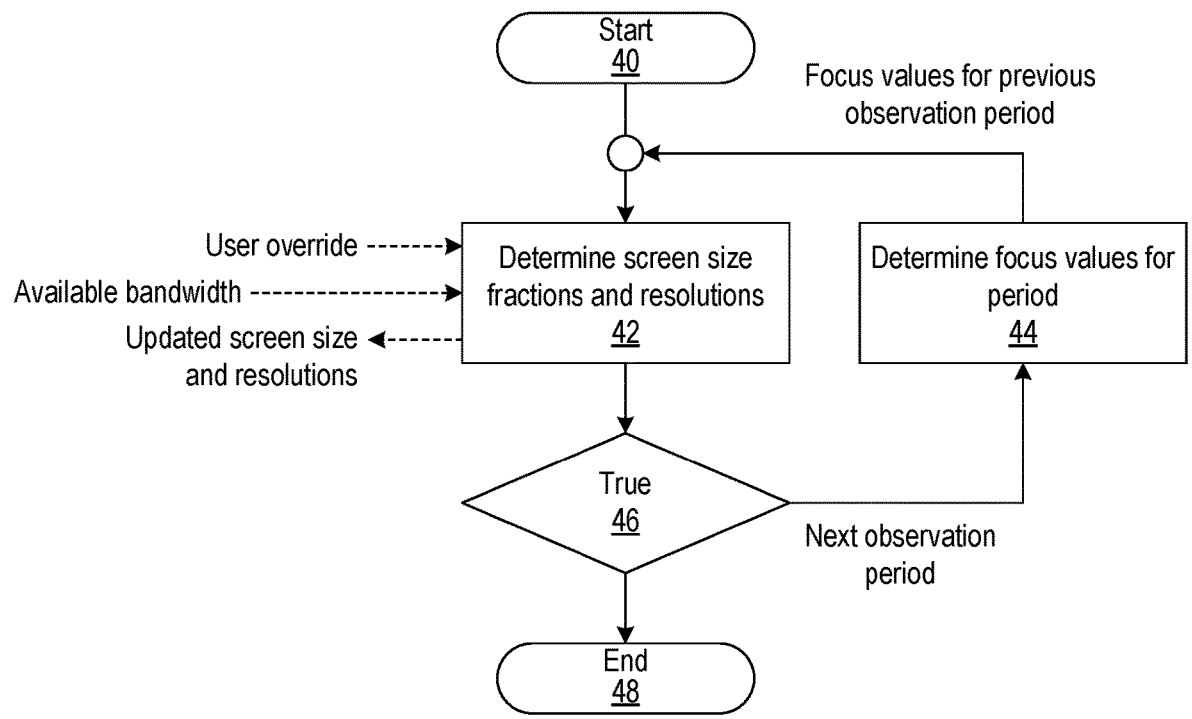
FIG. 4 is a flowchart showing the process used to decide on the fraction of the total screen size of and the selected resolution for a particular window or icon according to an embodiment of the invention.

FIG. 4 illustrates this process in which at the start of the process 40 a determination is made of screen size fractions and resolutions 42.

The herein disclosed method of using eye gaze to identify the focus of attention of a user and adjust the views in a multi-view application accordingly complements other interaction modes available to users, such as mouse click, that can help disambiguate user input. This is labelled as 'User override' in FIGS. 4 and 5.

The method identifies available bandwidth and provides updated screen size and resolution information. If the display corresponds to the focus value, that is the current display is true 46 then the process ends 48 until a next observation period. During the next observation period the method determines focus values of the period 44, which values replace the focus values for the previous observation period, and the process repeats as described.

User-Specific Attention Estimation

Different users may interact with a multi-view interface in different ways, constantly shifting their gaze among multiple windows or narrowly focusing on a particular one. Embodiments of the invention include data collected during prior user interactions through eye gaze and through alternative inputs, such as mouse clicks ('User override'). These data are compiled and processed with machine learning techniques to customize the response provided to a specific user, taking the device gaze information as input, and yielding a focus value.

Figure 5:
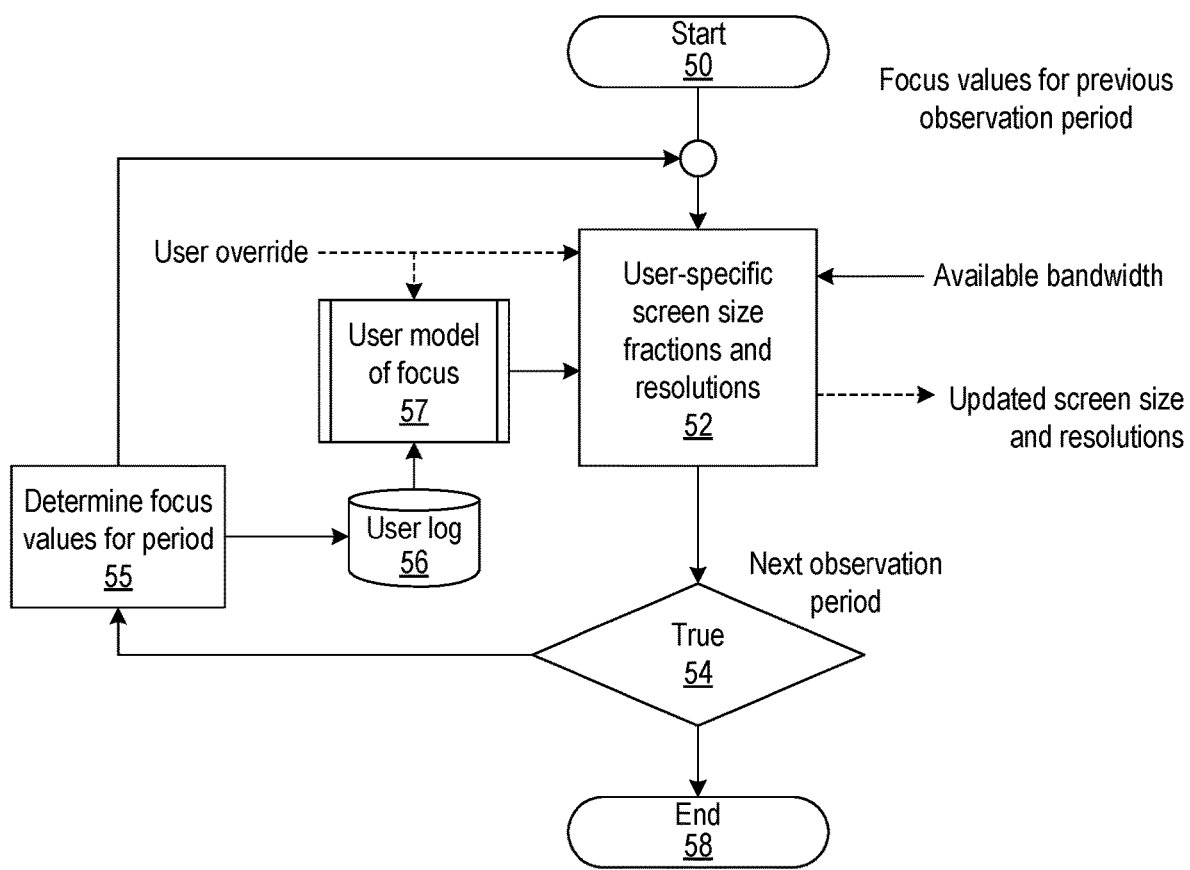
FIG. 5 is a flowchart showing the process for deciding, using a model generated for a given user that is based on logged data of the user's interactions, on the fraction of the total screen size of, and the selected resolution for, a particular window or icon according to an embodiment of the invention.

FIG. 5 illustrates this process in which at the start of the process 50 a determination is made of screen size fractions and resolutions 52. The method identifies available bandwidth and provides updated screen size and resolution information. The method also uses as an input a determination of focus values of the period 55 and, based on data collected during prior user interactions through eye gaze and through alternative inputs as stored in a user log 56, updates a user model of focus 57. If the display corresponds to the focus value, that is the current display is true 54 then the process ends 58 until a next observation period, and the process repeats as described.

Improving Seamless Change of Focus

As a user focus shifts from one window to another, the new dominant window takes a proportionally larger portion of the interface and is streamed at a higher quality level while the previous dominant window takes a smaller portion of the interface and is streamed at a lower quality level.

Figure 6:
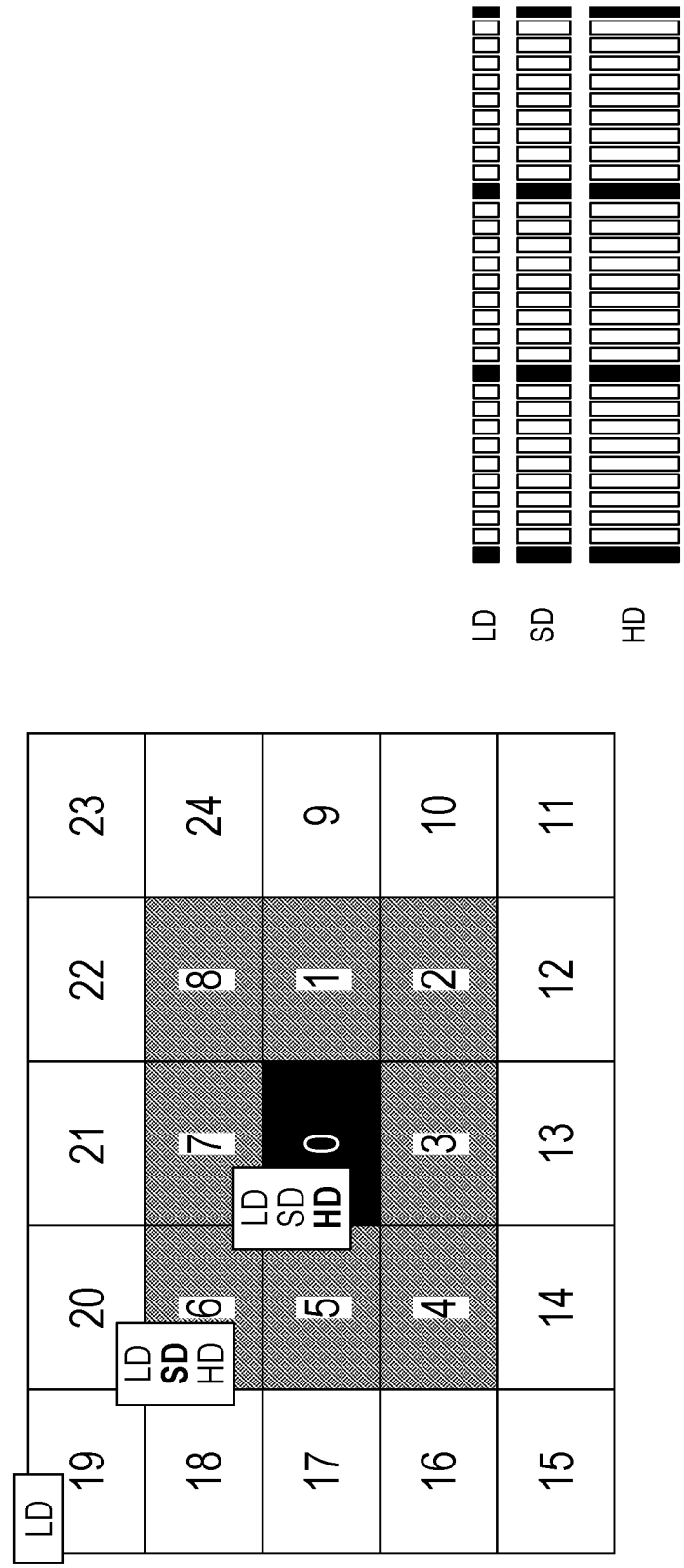
FIG. 6 is an illustration of an approach to generate alternative quality versions of a stream to facilitate the switch to a higher resolution as the user attention changes focus according to an embodiment of the invention.

The different streams composing the multi-view application are streamed using an adaptive bit-rate method that enables the seamless transition between different levels of quality and resolution, to a higher or lower quality for the new or old focus window, respectively. For real-time streaming, this seamless transition may require the dynamic or proactive generation of an alternative version of the same stream at a different level of quality. Because doing this for the potentially 10s or 100s of windows in a multi-view application may not scale, an embodiment of the invention distributes the allocated bandwidth budget for backup streams to windows surrounding the dominant window (see FIG. 6). This approach assumes that the focus of users shifts when they become aware of other, most likely nearby, perspectives or participants (see views 1-8 in FIG. 6) and allocates bandwidth budget for backup streams accordingly. The additional backup streams are used to support the seamless migration of attention focus back into and away from the dominant window.

Attention Dominant Windows

Figure 7:
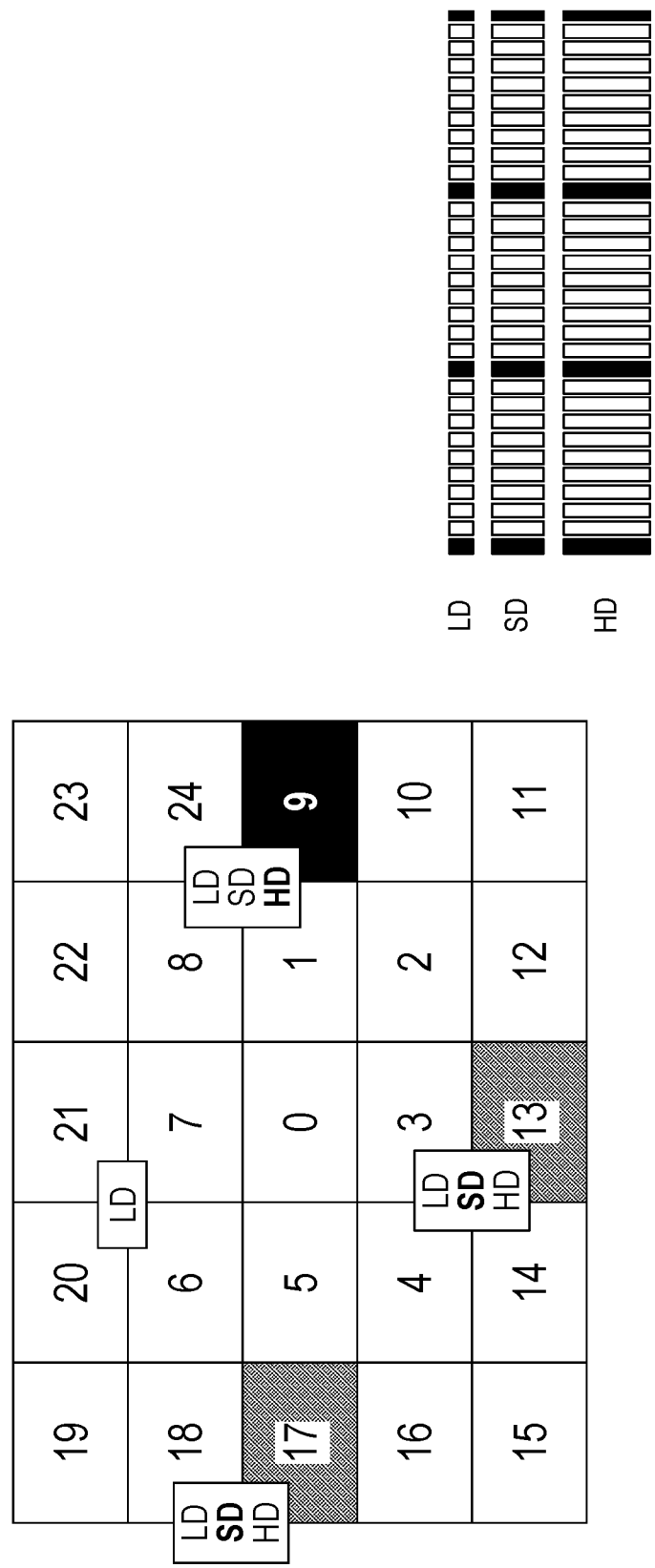
FIG. 7 is an illustration of a second approach to generate alternative quality versions of a stream based on user's past interactions to facilitate the switch to a higher resolution as the user attention changes focus according to an embodiment of the invention.

Over time, a user's attention may tend to give preference to certain windows over others, e.g. the speaker or a friend, so that throughout the session the user keeps returning to that window (see FIG. 7).

Embodiments of the invention uses machine learning techniques to analyze the collected data of prior user interactions to identify user-specific attention dominant windows and the allocation of bandwidth budget for backup streams associated with these windows (see views 13 and 17 in FIG. 7). As in the previous case, the additional backup streams support the seamless migration of attention focus back into and away from the dominant window.

Embodiments also detect user attention or inattention, for example during a video conference call or while viewing content, such as advertisements, performances, and the like. Metrics regarding such attention/inattention can be captured and used to generate various reports. Such information can also be used in real time to inform, for example, a broadcast service or sporting event promoter that most of their audience prefers one view over another. This information can be used to make global broadcast decisions in real time; alternatively, audience gaze information can be used to change a broadcast stream automatically, for example to select a dominant camera for the stream source.

Computer Implementation

Figure 8:
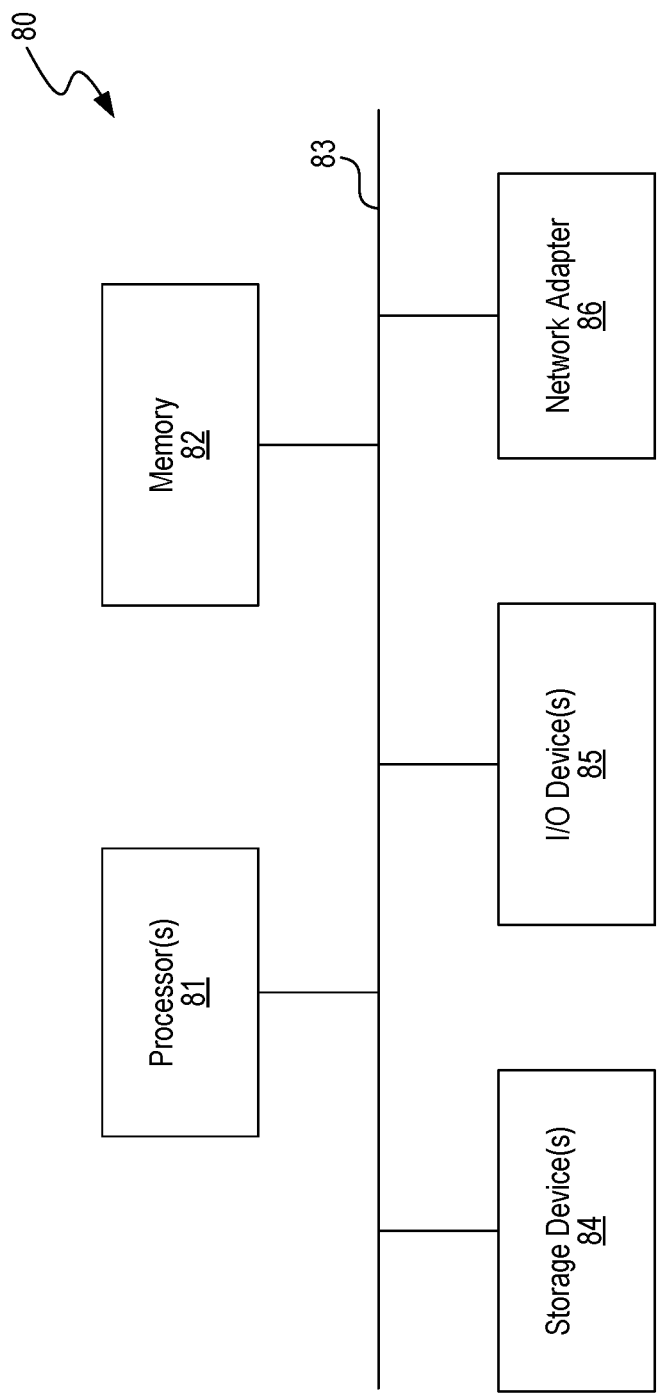
FIG. 8 shows a diagrammatic representation of a machine in the example form of a computer system within which a set of instructions for causing the machine to perform one or more of the methodologies discussed herein may be executed.

FIG. 8 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 80 may include one or more central processing units ("processors") 81, memory 82, input/output devices 85, e.g. keyboard and pointing devices, touch devices, display devices, storage devices 84, e.g. disk drives, and network adapters 86, e.g. network interfaces, that are connected to an interconnect 83. The interconnect 83 is illustrated as an abstraction that represents any one or more separate physical buses, point to point connections, or both connected by appropriate bridges, adapters, or controllers. The interconnect 83, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 82 and storage devices 84 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 82 can be implemented as software and/or firmware to program the processor 81 to carry out actions described above. In some embodiments, such software or firmware may be initially provided to the processing system 80 by downloading it from a remote system through the computing system 80, e.g. via network adapter 86.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

We claim:

1. A method for live and real-time media streaming, comprising:
    a multi-view application presenting a user with multiple windows, or icons, on a screen on a user device that represents multiple participants or perspectives;
    capturing a user's eye-gaze with at least one camera facing the user when the user, while operating said user device, gazes at a focus window;
    using said user's eye-gaze as a focus of attention of the user to identify a specific window or windows that are the focus of user attention; and
    based on said user's eye-gaze as a focus of attention dynamically determining and setting for a particular window or icon at any given point in time, both a fraction of a total size of said screen, and a selected resolution for, said particular window or icon as a function of a focus value of said particular window or icon, a fraction of screen resolution associated with a main window, and a maximum allocatable bandwidth available;

wherein when a main window comprises x % of the screen and the main window maximum resolution requires y % of the maximum allocatable bandwidth;
wherein a total screen allocation for all other windows of the screen is no more than 100-x %; and
wherein bandwidth demand for all other windows of the screen is more than 100-y % of a maximum allocated bandwidth.

2. The method of claim 1, said user device comprising a display, computational resources, and persistent and random-access memory.

3. The method of claim 2, wherein said user device is in communication with said at least one camera facing the user.

4. The method of claim 1, where the user device comprises any of a desktop, a laptop computer, a pad, or a smartphone.

5. The method of claim 1, wherein said multiple windows or icons represent all or a subset of participants in a multiparty call and/or multiple view angles of an event.

6. The method of claim 1, wherein said multi-view application comprises an interface of a multi-view streaming application with different streams, of different sizes and resolutions, as shown by windows, where each window comprises one of a plurality of different streams, of different sizes and resolutions.

7. The method of claim 1, wherein different streams are associated with different participants in a multi-party application and/or with different views in a multi-perspective application.

8. The method of claim 7, further comprising:
using audience information regarding user's eye-gaze for a plurality of users in real time to inform a broadcaster that most of their audience prefers one view over another; and any of
  using said audience information to make global broadcast decisions in real time;
  using said audience information to change a broadcast stream automatically; and
  using said audience information to select a dominant camera for a broadcast stream source.

9. The method of claim 1, further comprising:
providing a known bandwidth budget for every stream quality level;
wherein available levels of stream quality form a discrete set.

10. The method of claim 1, further comprising:
detecting user attention or inattention during a video conference call or while viewing content;
capturing metrics regarding said attention/inattention; and
using said metrics to generate reports.

11. A method for live and real-time media streaming, comprising:
a multi-view application presenting a user with multiple windows, or icons, on a screen on a user device that represents multiple participants or perspectives;
capturing a user's eye-gaze with at least one camera facing the user when the user, while operating said user device, gazes at a focus window;
using said user's eye-gaze as a focus of attention of the user to identify a specific window or windows that are the focus of user attention; and
based on said user's eye-gaze as a focus of attention dynamically determining and setting for a particular window or icon at any given point in time, both a fraction of a total size of said screen, and a selected resolution for, said particular window or icon as a function of a focus value of said particular window or icon, a fraction of screen resolution associated with a main window, and a maximum allocatable bandwidth available;
wherein every window or icon has an associated focus value, $f_w$ which is proportional to a fraction of time the user's gaze is focused on a particular window or icon over an observation period;
wherein a sum of all windows' focus values is equal to:
$100 (\Sigma_{All\ w} f_w = 100)$.

12. A method for live and real-time media streaming, comprising:
a multi-view application presenting a user with multiple windows, or icons, on a screen on a user device that represents multiple participants or perspectives;
capturing a user's eye-gaze with at least one camera facing the user when the user, while operating said user device, gazes at a focus window;
using said user's eye-gaze as a focus of attention of the user to identify a specific window or windows that are the focus of user attention; and
based on said user's eye-gaze as a focus of attention dynamically determining and setting for a particular window or icon at any given point in time, both a fraction of a total size of said screen, and a selected resolution for, said particular window or icon as a function of a focus value of said particular window or icon, a fraction of screen resolution associated with a main window, and a maximum allocatable bandwidth available;
dynamically adjusting a budget allocated to a particular window and its associated stream quality level as a function of user attention when a user's attention shifts between windows during a session by dividing the session into observation periods and tracking a user focus on the different views of a multi-view application interface during each period;
wherein a focus value of a particular window determined during an observation period t is used to allocate a fraction of said particular window screen size and assign a most appropriate resolution for an associated stream of said particular window during a subsequent observation period t+1.

13. A method for live and real-time media streaming, comprising:
a multi-view application presenting a user with multiple windows, or icons, on a screen on a user device that represents multiple participants or perspectives;
capturing a user's eye-gaze with at least one camera facing the user when the user, while operating said user device, gazes at a focus window;
using said user's eye-gaze as a focus of attention of the user to identify a specific window or windows that are the focus of user attention;
based on said user's eye-gaze as a focus of attention dynamically determining and setting for a particular window or icon at any given point in time, both a fraction of a total size of said screen, and a selected resolution for, said particular window or icon as a function of a focus value of said particular window or icon, a fraction of screen resolution associated with a main window, and a maximum allocatable bandwidth available;
dynamically adjusting a budget allocated to a particular window and its associated stream quality level as a function of user attention when a user's attention shifts between windows during a session by dividing the session into observation periods and tracking a user focus on the different views of a multi-view application interface during each period; and adjusting views in said multi-view application to complement other interaction modes available to said user to disambiguate said user's input.

14. A method for live and real-time media streaming, comprising:

a multi-view application presenting a user with multiple windows, or icons, on a screen on a user device that represents multiple participants or perspectives;

capturing a user's eye-gaze with at least one camera facing the user when the user, while operating said user device, gazes at a focus window;

using said user's eye-gaze as a focus of attention of the user to select among said multiple windows, or icons presented as available views of said multi-view application;

dynamically determining screen size fractions and resolutions for each of said multiple windows, or icons as follows:

during an initial observation period, providing updated screen size fraction and resolution information for each of said multiple windows, or icons when one or more specific windows, or icons that are the focus of user attention correspond to an initial focus value;

during a next observation period determining a next focus value for said next observation period;

replacing the initial focus value for the initial observation period with the next focus value for said next observation period;

dynamically updating said screen size fractions and resolutions for each of said multiple windows, or icons based on the next focus value for said next observation period;

identifying available bandwidth and providing updated screen size and resolution information; and using as an input a determination of focus values of a current period and, based on data collected during prior user interactions through eye gaze and through alternative inputs as stored in a user log, updating a user model of focus.

15. The method of claim 14, further comprising:

collecting data during user interactions through eye gaze and through alternative inputs when different users interact with said multi-view application in different ways by constantly shifting their gaze among multiple windows or narrowly focusing on a particular window; and using said device gaze information as an input, compiling and processing said data with machine learning techniques to yield a focus value; and using said focus value to customize a response provided to a specific user.

16. A method for live and real-time media streaming, comprising:

a multi-view application presenting a user with multiple windows, or icons, on a screen on a user device that represents multiple participants or perspectives;

capturing a user's eye-gaze with at least one camera facing the user when the user, while operating said user device, gazes at a focus window;

using said user's eye-gaze as a focus of attention of the user to identify a specific window or windows that are the focus of user attention to select among available views of a multi-view application;

as a user focus shifts from one window to another, dynamically providing a proportionally larger portion of the screen to a new dominant window comprising the window to which said user focus shifts;

streaming said new dominant window at a higher quality level while a previous dominant window takes a smaller portion of the screen and is streamed at a lower quality level;

streaming different streams composing the multi-view application using an adaptive bit-rate method to enable seamless transition between different levels of quality and resolution, to a higher or lower quality for the new or old focus window, respectively;

dynamically or proactively generating an alternative version of a same stream at a different level of quality for seamless transitions during real-time streaming; and supporting a seamless migration of attention focus back into and away from a dominant window by distributing an allocated bandwidth budget to additional backup streams surrounding said dominant window when user focus shifts.

17. The method of claim 16, further comprising:

allocating bandwidth budget for backup streams when a user's attention gives preference to certain windows over others and wherein throughout the session the user keeps returning to the preferred window.

18. The method of claim 16, further comprising:

using machine learning techniques to analyze collected data of prior user interactions to identify one or more user-specific attention dominant windows and the allocation of bandwidth budget for backup streams associated with said user-specific attention dominant windows to support seamless migration of attention focus back into and away from said one or more user-specific attention dominant windows.

19. An apparatus for live and real-time media streaming, comprising:

a user device comprising a display, computational resources, and persistent and random-access memory;

at least one camera facing the user when the user, while operating said user device, gazes at a focus window for capturing a user's eye-gaze, wherein said user device is in communication with said at least one camera facing the user;

a multi-view application configured for presenting a user with multiple windows, or icons, on a screen on said user device that represents multiple participants or perspectives;

a processor configured for using said user's eye-gaze as a focus of attention of the user to identify a specific window or windows that are the focus of user attention; and said processor configured, based on said user's eye-gaze as a focus of attention, for dynamically determining for a particular window or icon at any given point in time, both a fraction of total size of said screen, and a selected resolution for, said particular window or icon as a function of a focus value of said particular window or icon, a fraction of screen resolution associated with a main window, and a maximum allocatable bandwidth available;

wherein when a main window comprises x % of the screen and the main window maximum resolution requires y % of the maximum allocatable bandwidth;

wherein a total screen allocation for all other windows of the screen is no more than 100-x %; and wherein bandwidth demand for all other windows of the screen is more than 100-y % of a maximum allocated bandwidth.

* * * * *